Dec. 17, 1929.                S. M. McEWEN                 1,739,765
                          SUBSOILER AND AERATOR
                          Filed Jan. 31, 1927
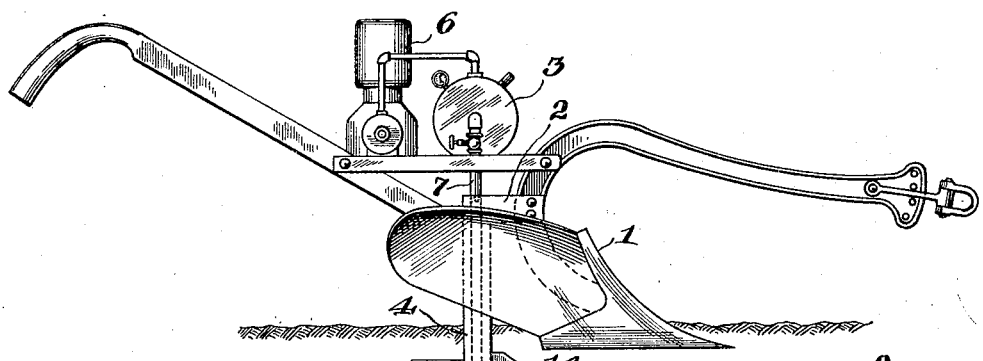
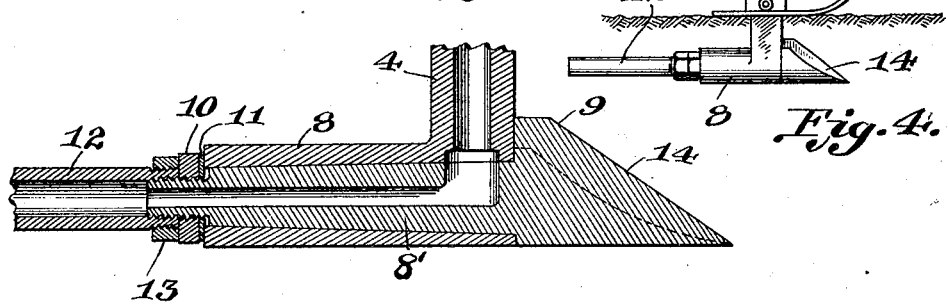
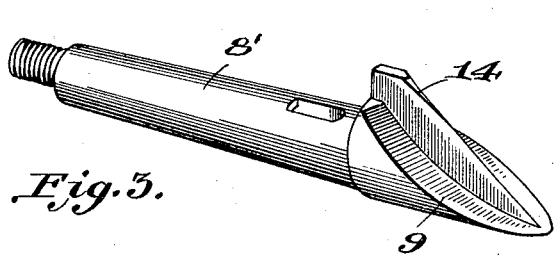
Inventor
Samuel M. McEwen
By John A. McLean
Attorney Patented Dec. 17, 1929

1,739,765

UNITED STATES PATENT OFFICE

SAMUEL M. McEWEN, OF UNIVERSITY, VIRGINIA

SUBSOILER AND AERATOR

Application filed January 31, 1927. Serial No. 164,923.

This invention relates to farm implements adapted to be used for pulverizing and aerating the soil. The device may be used in connection with plows, cultivators, harrows and other farm implements or it may be used alone and not in connection with any other implement. A special object of this device is to provide means for subsoiling, pulverizing and aerating the soil. It is an object of this invention to provide a device that can be attached to any of the above implements or that may be used separate from them. It is also an object of this invention to provide means for the enforced aeration of the soil by providing means whereby the air may be forced into the soil as it is pulverized and broken up. It is also an object of this invention to provide means for producing cavities in the soil for the retention of moisture in dry weather and for the draining of the soil in wet weather. By this device the dry and arid places may be converted into fertile and productive farms by preserving therein the moisture deposited in the wet, snowy season for use in the dry and less moist season. The cavities formed by this device act as reservoirs for the reception and retention of the accumulated moisture and make the moisture so retained available for use when the supply of moisture is otherwise exhausted.

The invention relates further to certain details of construction which will be hereinafter more fully described and finally embodied in the claims.

In the accompanying drawing illustrating the preferred embodiment of the invention, Figure 1 is the side view of a turning plow showing the subsoiling and aerating device attached thereto, Figure 2 is the longitudinal section of the mole piece and its adjacent parts, Figure 3 is the view in prospective of the mole piece itself, and Figure 4 is a side view of the device as used alone and without connection with any other implement.

In the drawing the numeral 1 is used in the present instance to represent a turning plow to which the subsoiling and aerating device is attached. The device is attached to the plow by means of a bracket member 2, and is composed essentially of three parts, a blower member 3, an upright stock member 4, and a mole member 5. The blower member 3 is of a conventional type and may be operated by any suitable motive power, which is here represented by the numeral 6. Leading from the blower and extending down through the upright stock member is a pipe 7, which is adapted to conduct air from the blower into a corresponding opening in the mole member 5 as is shown by Figure 2. On the lower end of the stock member and integral therewith, there is formed a cuff member 8, adapted to receive and carry the mole member. This cuff member extends backward from the lower end of the stock member. The mole member as shown by Figures 2 and 3 are provided with the head member 9, adapted to butt against the lower end portion of the stock member 4 and against the front or inner end portion of the cuff member 8, and is formed with a rearwardly extended sleeve member 8' adapted to fit within the cuff member 8. The part 8' of the mole member is provided with an opening, which communicates with the pipe 7 for conducting air back into the soil. The end of the mole member opposite the head 9 is provided with threads which receive the nut member 10. Between the nut member 10 and the end of the sleeve member is a packing or gasket 11, adapted to make a tight connection. Fitting over the threads on the end of the mole member is a sleeve member 12. The sleeve member 12 where it joins with the mole member is provided with threads to receive the lock-nut 13. The sleeve member 12 receives the air as it is forced through the pipe 7 and the mole member 8'.

The front or head end of the mole member is beveled off as shown in Figure 3 in order to enable it to more readily enter the soil when in use, and is also provided with a blade-like projection 14 to aid in the opening of the soil.

In Figure 4 this device is shown adapted to be attached to some drawing member by means of a bracket 2. In the device used separate from any other implement it might be necessary to use some means to gauge the depth to which the mole member should enter the soil. For this purpose there is provided a float member 15, adapted to slide up and down on the stock member 4. The float member 15 is held in adjusted position by means of a rod 16 passing through a cuff member 17. The rod 16 is held in relation to the cuff 17 by means of the thumb screw 18. It can be readily seen that by means of the float member 15 the depth to which the mole member enters the soil can be very definitely regulated. The whole subsoiling and aerating structure shown in Figure 1 is adapted to be and is intended to be used in connection with the structure shown in Figure 4. Figure 4 merely shows the lower part of the device removed from the plow to show a special depth controlling means necessary when the device is used in some other connection than with the plow.

In the operation of this device as attached to another farm implement the mole member may be made to extend down to or below the lowest part of said implement, and while being thus used the blower member is operated to force air through the pipe member 7 and out through the opening in the mole member and through the sleeve member into the soil as it is being broken up. By this means there is left in the soil after it is broken up a longitudinal cavity of about the size of the sleeve member which is full of air. This longitudinal cavity in addition to being an air container may serve and does serve to retain the moisture in dry weather and to drain off the moisture in wet weather.

The size of the longitudinal cavity may be varied by using mole members of different sizes.

Having thus described my invention what I claim as new and wish to protect by Letters Patent is defined in the following claims:

1. In a subsoiling and aerating device, a plow mole means associated with and extending below the plow for opening the soil, said mole means having an air-conducting passage therein, a blower, means extending from the blower to the air-conducting passage of the mole for the purpose of conducting air from the blower through the mole into the soil.

2. A subsoiler and aerating device comprising a plow, means associated therewith for breaking up the subsoil below the ordinary plowing depth or level, and means for forcing air through said subsoil breaking means.

3. In a subsoiling and aerating device a plow means associated therewith for opening the soil below the depth of the plow for the purpose of providing water and air reservoirs therein and means for conducting air into the soil for the purpose of aerating said soil.

In testimony whereof I affix my signature.

SAMUEL M. McEWEN.